US006430657B1

(12) United States Patent
Mittal et al.

(10) Patent No.: US 6,430,657 B1
(45) Date of Patent: Aug. 6, 2002

(54) COMPUTER SYSTEM THAT PROVIDES ATOMICITY BY USING A TLB TO INDICATE WHETHER AN EXPORTABLE INSTRUCTION SHOULD BE EXECUTED USING CACHE COHERENCY OR BY EXPORTING THE EXPORTABLE INSTRUCTION, AND EMULATES INSTRUCTIONS SPECIFYING A BUS LOCK

(75) Inventors: Millind Mittal, Palo Alto; Martin J. Whittaker, Cupertino; Gary N. Hammond, Campbell; Jerome C. Huck, Palo Alto, all of CA (US)

(73) Assignee: Institute for the Development of Emerging Architecture L.L.C., Cupertino, CA (US)

( * ) Notice: Subject to any disclaimer, the term of this patent is extended or adjusted under 35 U.S.C. 154(b) by 0 days.

(21) Appl. No.: 09/170,137

(22) Filed: Oct. 12, 1998

(51) Int. Cl.[7] ............................................. G06F 12/10
(52) U.S. Cl. ...................... 711/138; 711/207; 711/143; 711/118
(58) Field of Search ................................. 711/118, 141, 711/143, 145, 152, 155, 163, 138; 710/200

(56) References Cited

U.S. PATENT DOCUMENTS

| 5,428,761 A | * | 6/1995 | Herlihy et al. | 711/130 |
| 5,535,365 A | * | 7/1996 | Barriuso et al. | 711/155 |
| 5,574,922 A | * | 11/1996 | James | 712/220 |
| 5,761,731 A | * | 6/1998 | Doren et al. | 711/155 |
| 5,895,495 A | * | 4/1999 | Arimilli et al. | 711/156 |

* cited by examiner

Primary Examiner—Matthew Kim
Assistant Examiner—Christian P. Chace
(74) Attorney, Agent, or Firm—David A. Plether

(57) ABSTRACT

Atomic memory operations are provided by using exportable "fetch and add" instructions and by emulating IA-32 instructions prepended with a lock prefix. In accordance with the present invention, a CPU includes a default control register that includes IA-32 lock check enable bit (LC) that when set to "1", causes an IA-32 atomic memory reference to raise an IA-32 intercept lock fault. An IA-32 intercept lock fault handler branches to appropriate code to atomically emulate the instruction. Furthermore, the present invention defines an exportable fetch and add (FETCHADD) instruction that reads a memory location indexed by a first register, places the contents read from the memory location into a second register, increments the value read from the memory location, and stores the sum back to the memory location. Associated with each virtual memory page is a memory attribute that can assume a state of "cacheable using a write-back policy" (WB), "uncacheable" (UC), or "uncacheable and exportable" (UCE). When a FETCHADD instruction is executed and the memory location accessed is in a page having an attribute set to WB, the FETCHADD is atomically executed by the CPU by obtaining exclusive use of the cache line containing the memory location. However, when a FETCHADD instruction is executed and the memory location accessed is in a page having an attribute set to UCE, the FETCHADD is atomically executed by exporting the FETCHADD instruction to a centralized location, such as a memory controller.

6 Claims, 2 Drawing Sheets

COMPUTER SYSTEM THAT PROVIDES ATOMICITY BY USING A TLB TO INDICATE WHETHER AN EXPORTABLE INSTRUCTION SHOULD BE EXECUTED USING CACHE COHERENCY OR BY EXPORTING THE EXPORTABLE INSTRUCTION, AND EMULATES INSTRUCTIONS SPECIFYING A BUS LOCK

FIELD OF THE INVENTION

The present invention relates to memory access operations in computer systems. More specifically, the present invention relates to atomic memory update operations typically used to access semaphores.

DESCRIPTION OF THE RELATED ART

In computer systems, it is common for two or more processes to contend for the same resource. For example, two or more processes may attempt to write a particular sequence of commands to a video controller. The processes may be executed by a single central processing unit (CPU), or may be executed by two or more CPUs in a multi-processor computer system. The terms CPU and processor will be used herein in interchangeably.

Since the processes cannot access the resource at the same time, the operating system of the computer must provide some mechanism to schedule access to the resource. One common mechanism known in the art is the "take-a-number" scheduling algorithm. This algorithm is somewhat analogous to a group of customers that wish to be serviced by a single store clerk. When a customer enters the store, the customer takes a number. When the clerk calls that number, the customer is serviced by the clerk.

Using this analogy, the mechanism that provides the "number" to the process is known in the art as a semaphore. Typically, a semaphore is stored in a memory location. A process seeking to access the semaphore first reads the memory location, increments the value read from the memory location, and stores the result back in the memory location. The value read from the memory location acts as the "number" for the process, and the result written back to the memory location acts as the next "number" for the next process that attempts to access the resource. When the operating system indicates that the holder of a particular "number" may access the resource, the process holding that "number" does so.

For the "take-a-number" scheduling algorithm to operate correctly, it is critical that the memory read, increment, and memory write operations occur "atomically". In other words, there must be no chance that a second process can read the memory location holding the semaphore between the point at which the first process reads the memory location and the point at which the first process writes the incremented value back to the memory location. If such a read operation by the second process occurred, then the first and second processes would each have the same "number", and may try to access the resource concurrently.

Ensuring that semaphore operations occur atomically is relatively simple in a single CPU computer system in which no other devices coupled to the bus perform direct memory access (DMA) operations. For example, the 32-bit Intelg architecture (IA-32), which is used by the Intel® i486™, Pentium®, Pentium® Pro, Pentium® II, and Celeron™ CPUs, includes the "exchange and add" (XADD) instruction. When using this instruction to access a memory location containing a semaphore, the XADD instruction is typically used as follows:

XADD destination memory location, source register

This instruction stores the sum of the values contained in the destination memory location and the source register in a temporary register, stores the contents of the destination memory location in the source register, and stores the contents of the temporary register in the destination memory location. Accordingly, if the value "1" is stored in the source register when the instruction is executed, then when the instruction is completed the value in the destination memory location will be incremented by "1" and the value originally in the destination memory location will be stored in the source register. Since an interrupt will not be processed until an instruction is complete and the computer system in this example has a single CPU (and no other devices are performing DMA operations), no other process can access the semaphore during the read-modify-write operation performed by the XADD instruction. Accordingly, the semaphore operation occurs atomically. The IA-32 exchange (XCHG) instruction and compare and exchange (CMPXCHG) instruction are also commonly used to ensure atomic access to semaphores.

In multi-processor computer systems and systems having devices that perform DMA operations, assuring atomicity is more complex because it is possible that a second CPU or device may attempt to access the semaphore before the first CPU increments and writes the semaphore back to the memory location. In such computer systems, atomicity is provided either by a bus lock mechanism or a cache coherency mechanism. Before discussing these mechanisms in detail, it is helpful to first consider the operation of CPU cache memories.

Cache memories are relatively small and fast memories that hold a subset of the contents of main memory. For example, a computer system based on a Pentium® II CPU has a level one (L1) cache on the same integrated circuit (IC) as the CPU, and a level two (L1) cache on the same module as the CPU, but on a separate IC. The L1 cache is smaller and faster than the L2 cache. Main memory contents are stored in cache memories in units called cache lines. The cache line size of the L1 and L2 caches in a Pentium® CPU is 32 bytes.

The Intel® i486™ CPU uses a "write-through" L1 cache. In such a cache, a memory write from the CPU is written to the cache and main memory concurrently. Beginning with the Intel® Pentium® CPU, Intel® processors provide support for "write-back" caches. In a write-back cache, a memory write from the CPU is only written to the cache. The cache mechanism then determines whether (and when) the memory write is actually committed to main memory. This increases performance because the write to main memory can be deferred until main memory is not busy. In addition, it is possible that the memory operand many change several times before it is necessary to write the memory operand back to main memory. Also, it provides an opportunity for a cache to assemble a complete cache line of changes before writing the cache line back to memory, which is known in the art as coalescing.

Cache coherency mechanisms ensure that memory contents stored in CPU caches and main memory remain coherent. For example, if the cache of a first CPU contains a cache line having changed (or "dirty") contents that have not been written back to main memory, and a second CPU attempts to read the corresponding memory location from main memory, the cache coherency mechanism ensures that the second CPU is provided with the correct contents from the cache of the first CPU, not the incorrect contents currently stored in main memory. The cache coherency mechanism can accomplish this in several ways. One technique is to simply force the cache of the first CPU to write the changed cache line back to main memory. Another technique allows the cache of a second CPU to "snoop" changes to the cache of the first CPU, thereby allowing the second CPU cache to be continually updated with the changes made in the first CPU cache.

Furthermore, a CPU can request that a cache line be loaded as "shared" or "exclusive". A shared cache line cannot be changed by the CPU, and therefore is advantageously used in situations where it is known that the contents of the cache line will not be changed (e.g., program code). An exclusive (or alternatively, "private") cache line can be changed by the CPU. Typically, a "dirty bit" is associated with an exclusive cache line to indicate if the contents have changed. If the dirty bit is set to indicate that the cache line has changed, the cache line must be written back to main memory. If the dirty bit is cleared to indicate that the cache line has not changed, the cache line can be discarded with being written back to main memory. Typically only one CPU can hold a particular cache line as exclusive at any given time.

Returning to the topic of atomicity, early IA-32 CPUs provide atomicity by storing semaphores in non-cacheable memory or memory cached using the write-through method, and by issuing a "bus lock" when accessing the semaphore. A bus lock ensures that a single CPU has exclusive ownership of the bus during the read-modify-write transactions required by a semaphore operation. This method extracts a rather heavy performance penalty since all other CPUs are blocked from accessing the bus during the pendency of the read-modify-write transaction, even though the other CPUs may not need to access the region of memory containing the semaphore. Note that in high-end multi-processor systems employing a variety of interconnection fabrics, the notion of a "bus" and therefore a "bus lock" may disappear entirely. For example, in a multi-processor system having pods comprised of four-processors, with each of the processors in a pod coupled via a conventional bus, and with each of the pods interconnected via a ring topology, a CPU in one pod will typically not be able to lock the bus in another pod.

Later IA-32 CPUs provide atomicity via the cache coherency mechanism. When a CPU accesses a semaphore, the L1 cache of the CPU requests exclusive use of a cache line that includes the memory location holding the semaphore. Therefore, the CPU can perform the read-modify-write transaction required by the semaphore operation without the possibility that another CPU can access the semaphore during the transaction. Accordingly, other CPUs can continue to access the bus, and therefore memory. In essence, an "in-cache" atomic update is performed via an "address lock", since the only region of main memory not accessible to the other CPUs is the cache line held as exclusive in the cache of the CPU performing the semaphore operation. Note that since the whole cache line is held as exclusive, it is often desirable to not store multiple semaphores in a single cache line.

While providing atomicity via cache coherency provides much better performance than providing cache coherency via bus locks, "semaphore cache line thrashing" can still limit performance. Semaphore cache line thrashing occurs when two or more CPUs continually compete for the same resource, and therefore the same semaphore. Accordingly, each CPU continually tries to obtain exclusive control over the cache line containing the semaphore, resulting in the cache line being continually loaded into and written out of each CPU's cache. Typically, while a CPU is waiting to gain exclusive access to a cache line containing a semaphore, the CPU cannot make progress.

In the prior art, some large multi-processor systems have addressed this problem using a "fetch and add" instruction (FETCHADD). The "increment" operation associated with the FETCHADD instruction is exported to a centralized location, such as a memory controller. Accordingly, when a CPU executes a FETCHADD instruction referencing a semaphore stored in a memory location, the memory controller provides the semaphore value stored in the memory location to the CPU. Furthermore, the memory controller increments the semaphore and stores the result back in the memory location. Therefore, the CPU never needs to acquire exclusive access to the cache line containing the semaphore because the CPU never needs to write the memory location containing the semaphore, thereby eliminating semaphore cache line thrashing. In addition, it is possible to store semaphores in memory more efficiently, since more than one semaphore can exist within a cache line boundary without incurring a performance penalty.

In the computer industry, there is a continuing positive trend toward high-performance hardware. However, there is also a somewhat conflicting positive trend toward low-cost "off-the-shelf shrink-wrapped" operating systems (and other software) that can execute on a wide variety of hardware architectures, including hardware architectures that provides atomicity via bus locks, cache coherency mechanisms, and exportation of instructions designed to provide atomic semaphore updates. However, prior art methods of providing atomicity generally assume that the software is "aware" of the method by which atomicity is provided. Accordingly, software designed to access semaphores using bus locks will not be able to take advantage of the superior semaphore performance provided by cache coherency mechanisms and exportation of instructions designed to provide atomic semaphore updates. Similarly, software designed to access semaphores using cache coherency mechanisms will not be able to take advantage of the superior semaphore performance provided by exportation of instructions designed to provide atomic semaphore updates. What is needed in the art is a computer architecture that allows low-cost "off-the-shelf shrink-wrapped" software to access the highest performing atomic update method provided by the computer system hardware on which it is executing, without the software having to be explicitly coded to exploit particular atomic update methods.

SUMMARY OF THE INVENTION

The present invention provides a 64-bit architectural framework in which IA-32 instructions requiring bus locks will execute efficiently on computer hardware that provides superior methods of providing atomicity. In addition, the present invention provides an architectural framework that defines an exportable 64-bit fetch and add (FETCHADD) instruction, which can be coded into "off-the-shelf shrink-wrap" software, and a programmable method by which the hardware can ensure atomicity in executing the FETCHADD instruction by exporting the instruction, or by using a cache coherency mechanism.

In the IA-32 instruction set, the LOCK prefix can be prepended to the following instructions, and only to those forms of the instructions that access a memory operand: ADD, ADC, AND, BTC, BTR, BTS, CMPXCHG, DEC, INC, NEG, NOT, OR, SBB, SUB, XOR, XADD, and XCHG. In accordance with the present invention, a CPU includes a default control register that includes IA-32 lock check enable bit (LC). When LC bit is set to "1", and an IA-32 atomic memory reference requires a read-modify-write operation external to the processor under an external bus lock (i. e., the instruction includes the LOCK prefix), an IA-32 intercept lock fault is raised, and an IA-32 intercept lock fault handler is invoked. The fault handler examines the IA-32 instruction that caused the interruption and branches to appropriate code to atomically emulate the instruction. Accordingly, the present invention allows a computer system having a 64-bit architecture in accordance with the present invention to maintain binary compatibility with IA-32 instructions, while maintaining the superior performance provided by the 64-bit architecture by not locking the bus.

Furthermore, the present invention defines an exportable fetch and add instruction having the following format:

FETCHADD $R_1=[R_3]$, INC

This instruction reads the memory location indexed by register $R_3$, places the contents read from the memory location in register $R_1$, adds the value INC to the contents read from the memory location, and stores the sum back in the memory location.

Associated with each virtual memory page is a memory attribute that can assume a state of "cacheable using a write-back policy" (WB), "uncacheable" (UC), or "uncacheable and exportable" (UCE). When a FETCHADD instruction is executed and the memory location accessed is in a page having an attribute set to WB, the FETCHADD instruction is atomically executed by the CPU by obtaining exclusive use of the cache line containing the memory location. However, when a FETCHADD instruction is executed and the memory location accessed is in a page having an attribute set to UCE, the FETCHADD instruction is atomically executed by exporting the FETCHADD instruction to a centralized location, such as a memory controller, thereby eliminating semaphore cache line thrashing.

Accordingly, the present invention provides an architectural framework in which "off-the-shelf shrink-wrap" software can be encoded with semaphores accessed by a FETCHADD instructions, even though the software "does not know" whether atomicity will be provided by the cache coherency mechanism, or by exporting the FETCHADD instruction to a centralized location, such as a memory controller. Therefore, such software will be able to access the fastest method of providing atomic update operations available on the computer hardware, without the software requiring individual code segments for each method.

DETAILED DESCRIPTION OF THE PREFERRED EMBODIMENTS

The present invention provides a 64-bit architectural framework in which IA-32 instructions requiring bus locks will execute efficiently on computer hardware that provides superior methods of providing cache coherency. In addition, the present invention provides an architectural framework that defines an exportable 64-bit fetch and add (FETCHADD) instruction, which can be coded into "off-the-shelf shrink-wrap" software, and a programmable method by which the hardware can ensure atomicity in executing the FETCHADD instruction by exporting the instruction, or by using a cache coherency mechanism.

Figure 1:
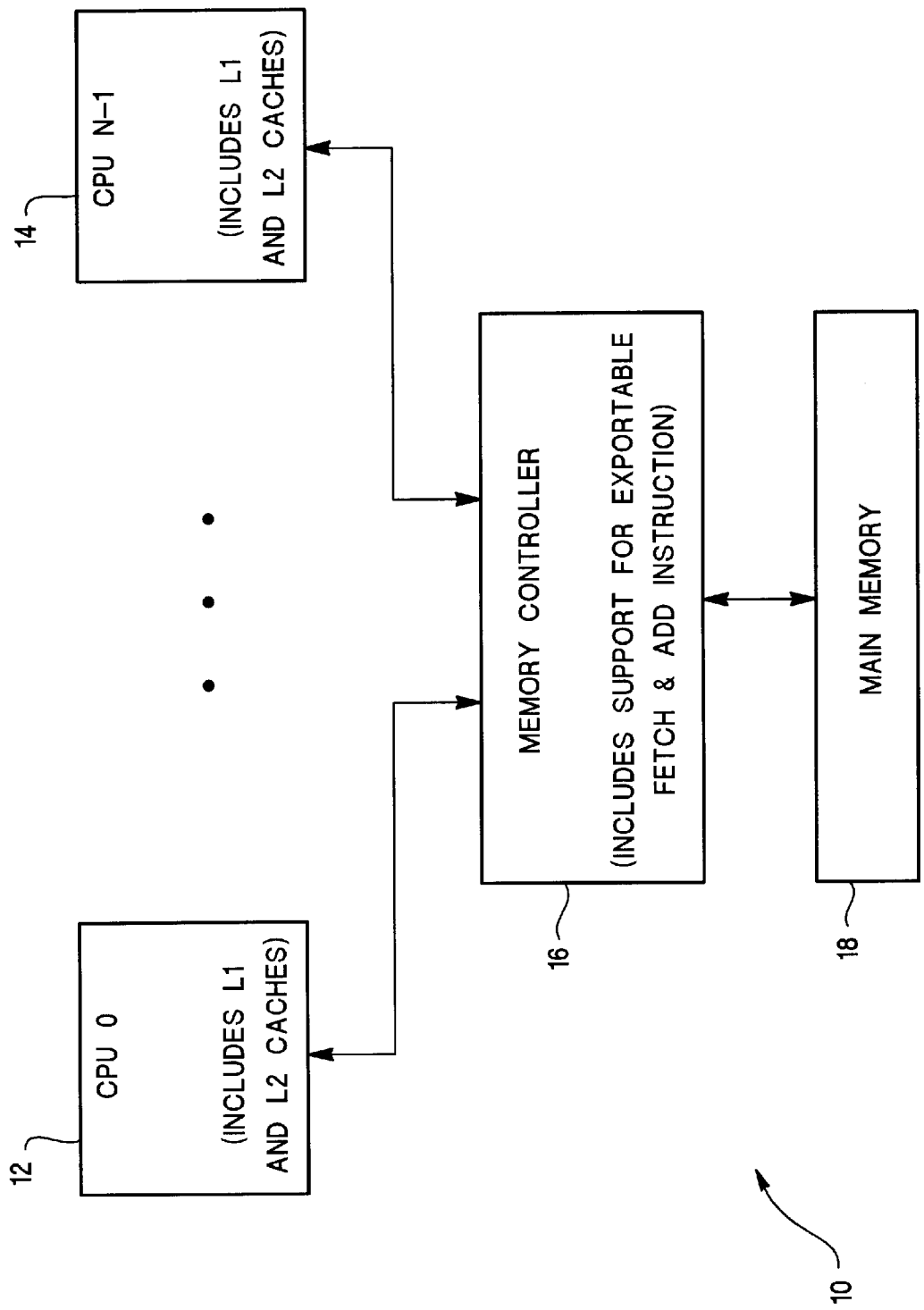
FIG. 1 is a simplified diagram of a computer system 10 that includes N CPUs, a memory controller, and a main memory.

FIG. 1 is a simplified diagram of a computer system 10, and will be used to illustrate the present invention. Computer system 10 includes N CPUs, such as CPUs 12 and 14. System 10 also includes memory controller 16 and main memory 18. Memory controller 16 includes support for executing an exportable FETCHADD instruction.

Before discussing the CPUs 12 and 14 below, first consider the FETCHADD instruction defined in accordance with the present invention. The instruction has the allowing format:

FETCHADD $R_1=[R_3]$, INC

This instruction reads the memory location indexed by register $R_3$, and places the contents read from the memory location in register $R_1$. Furthermore, this instruction adds he value INC to the contents read from the memory location and stores the sum back in the memory location. The above presentation of the FETCHADD instruction is simplified. Additional instruction "completers" specify such options as the size of the operand to be read from memory, the ordering semantics of the instruction with respect to other instructions, and prefetch hints that are used when prefetching the FETCHADD instruction into a CPU cache. However, the format of the instruction presented above is sufficient to provide an understanding of the present invention.

Figure 2:
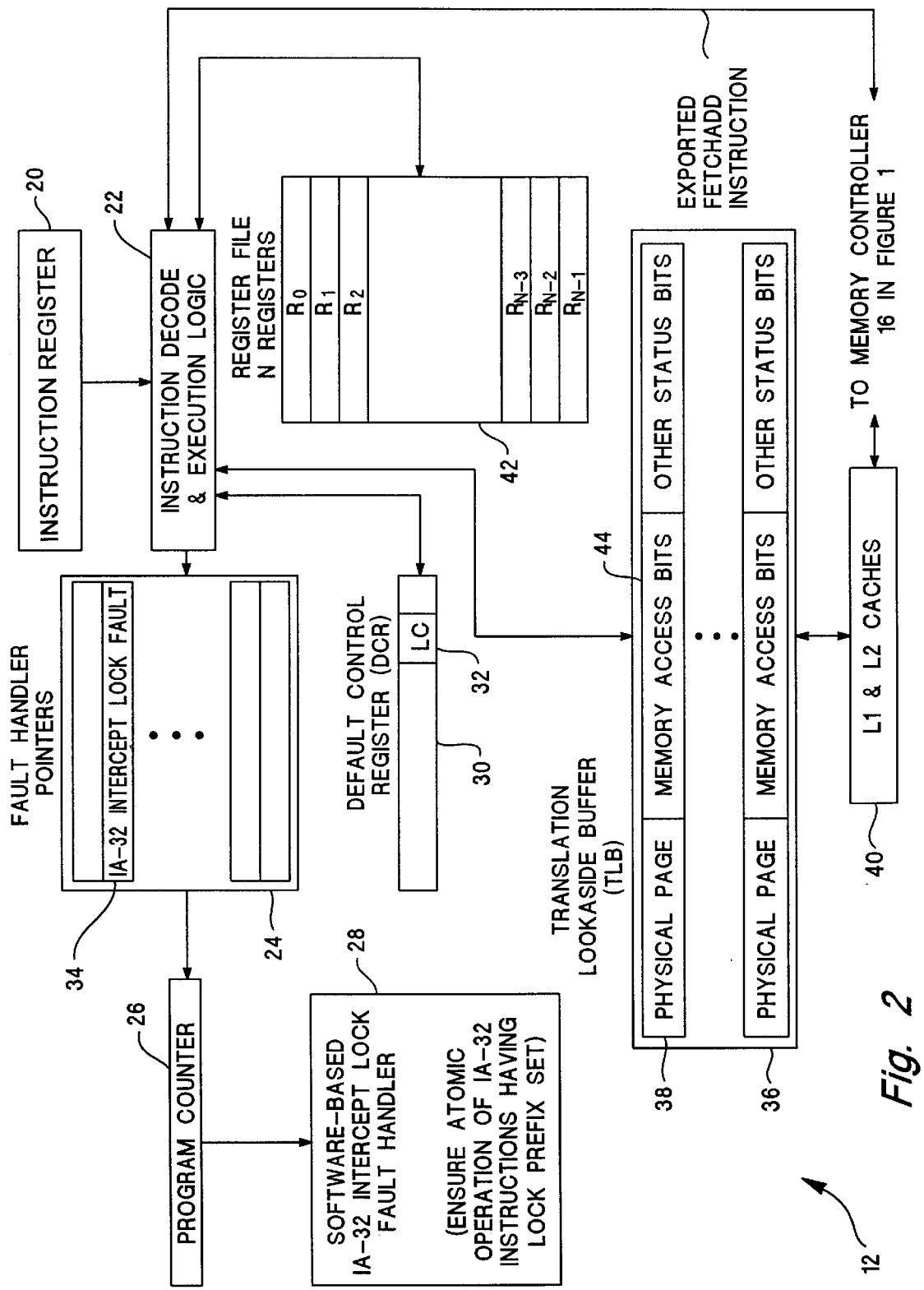
FIG. 2 is a block diagram of one of the CPUs of FIG. 1, in accordance with the present invention.

FIG. 2 is a block diagram of CPU 12 of FIG. 1. Of course, FIG. 2 represents all CPUs of computer system 10. CPU 12 includes instruction register 20, instruction decode and execution logic 22, fault handler pointers 24, program counter 26, software-based IA-32 intercept lock fault handler 28, default control register (DCR) 30, translation lookaside buffer (TLB) 36, and L1 and L2 cache memories 40. Those skilled in the art will recognize that FIG. 2 is a simplified diagram, and a CPU implementing the present invention would be considerably more complex. However, FIG. 2 is sufficient to illustrate the novel aspects of the present invention.

As is known in the art, most computer systems use a technique called virtual memory which simulates more memory than the physical memory actually present. The mapping of the virtual addresses to the main memory addresses is a process known as virtual address translation. The virtual address and physical address spaces are typically divided into equal size blocks of memory called pages, and a page table provides the translation between virtual addresses and physical addresses. Each page table entry typically contains the physical address, and protection and status information concerning the page. Status information typically includes information about the type of accesses the page has undergone, and page protection information. For example, a dirty bit indicates there has been a modification to data in the page. Because the page tables are usually large, they are stored in memory. Therefore each regular memory access can actually require at least two accesses, one to obtain the translation and a second to access the physical memory location.

Most computer systems that support virtual address translation use a translation lookaside buffer (TLB). The TLB is typically a small, fast, associative memory which is usually situated on or in close proximity to the CPU and stores recently used pairs of virtual and physical addresses. The TLB contains a subset of the translations in the page table and can be accessed much more quickly. When the processing unit needs information from main memory, it sends the virtual address to the TLB. The TLB accepts the virtual address page number and returns a physical page number. The physical page number is combined with low order address information to access the desired byte or word in main memory. If the translation for the virtual address is not in the TLB, it is retrieved from the page table. If the translation is not in the page table, a page fault is generated.

In accordance with the present invention, TLB 36 includes memory access bits that determine whether a FETCHADD instruction that reads and writes to a page represented by the TLB entry can be exported. For example, TLB entry 38 includes memory access bits field 44. As discussed above, a TLB usually contains a subset of the virtual-to-physical mappings contained in the page table. Therefore, a page table adapted for use with the present invention also contains a copy of the memory access bits.

Table 1 shows the virtual addressing memory attribute encodings that can be represented by the memory access bits.

TABLE 1

| Memory Policy | Mnemonic | Encoding |
| --- | --- | --- |
| Write Back | WB | 00 |
| Uncacheable | UC | 01 |
| Uncacheable-Exportable | UCE | 10 |

Note the encodings shown in Table 1 have been simplified to better illustrate the present invention. In other embodiments, it may be desirable to encode additional functionality into the memory access bits.

To illustrate how these encodings are used, assume that either CPU 12, or the computer system in which CPU 12 is operating, does not support exportable FETCHADD instructions. In such a computer system, atomicity is provided by the cache coherency algorithm. When the virtual-to-physical mappings are established for memory locations containing semaphores, the memory access bits in the page table and TLB entries corresponding to the pages where the semaphores are stored are assigned a memory policy of WB, and therefore the memory access bits are set to "00".

Accordingly, when a FETCHADD instruction is loaded into instruction register 20, instruction decode and execution logic 22 examines the memory access bits stored in the TLB entry corresponding to the memory location specified by the FETCHADD instruction. The memory access bits indicate that the semaphore is stored in a memory page that is cached using a write-back policy, so the cache line containing the semaphore is loaded into L1 and L2 caches 40 and held as exclusive. Thereafter, instruction decode and execution logic 22 retrieves the semaphore from the L1 cache and loads the semaphore into the register of register file 42 specified in the FETCHADD instruction, increments the semaphore, and stores the incremented semaphore back in the L1 cache. When the semaphore is required by another CPU, CPU 12 relinquishes exclusive use of the cache line containing the semaphore and the other CPU obtains exclusive use of the cache line. While this may result in a certain amount of cache line thrashing, the performance is more than sufficient for low end and mid-range computer systems.

Now assume that CPU 12 and the computer system in which CPU 12 is operating both support exportable FETCHADD instructions. In such a computer system, atomicity for FETCHADD instructions can be provided by either exporting the FETCHADD instruction to the memory controller (or other centralized location), or by the cache coherency mechanism. When the virtual-to-physical mappings are established for memory locations containing semaphores, the memory access bits in the page table and TLB entries corresponding to the pages where the semaphores are stored are assigned a memory policy of UCE, and therefore the memory access bits are set to "10".

Accordingly, when a FETCHADD instruction is loaded into instruction register 20, instruction decode and execution logic 22 examines the memory access bits stored in the TLB entry corresponding to the memory location specified by the FETCHADD instruction. The memory access bits indicate that the semaphore is stored in a memory page that is uncached and exportable. Therefore, instruction decode and execution logic 22 exports the FETCHADD instruction to memory controller 16 in FIG. 1. Controller 16 reads the semaphore from main memory 18 in FIG. 1 and provides the semaphore to instruction decode and execution logic 22, which in turn stores the semaphore in the register of register file 42 specified in the FETCHADD instruction. Memory controller 16 increments the semaphore, and stores the result back in main memory 18. Since the semaphore is never held as exclusive in a cache line, another CPU can access the semaphore immediately without having to obtain exclusive use of the cache line containing the semaphore. Accordingly, cache line thrashing is eliminated. Note that it may be desirable for memory controller 16 to maintain a cache of semaphores that are accessed by FETCHADD instructions, thereby allowing memory controller 16 to respond more quickly by not having to access main memory 18.

In summary, the present invention provides an architectural framework in which "off-the-shelf shrink-wrap" software can be encoded with semaphores accessed by a FETCHADD instructions, even though the software "does not know" whether atomicity will be provided by the cache coherency mechanism, or by exporting the FETCHADD instruction to a centralized location, such as memory controller 16. Accordingly, such software will be able to access the fastest method of providing atomic update operations available on the computer hardware, without the software requiring individual code segments for each method.

Another advantage provided be the present invention is that a very narrow range of memory locations can be selectively enabled to support exportation of the FETCHADD instruction. Accordingly, the operating system can configure a small portion of memory to be uncacheable-exportable, and when application programs request memory space for semaphores from the operating system, the operating system can allocate such space in the regions configured as uncacheable-exportable. The present invention also allows an operating system to prevent exportation of the FETCHADD instruction to memory ranges that do not support exportable FETCHADD instructions, such as memory locations mapped to I/O devices.

While the present invention provides a 64-bit FETCHADD instruction and supporting architectural framework that provides atomicity by selecting either a cache coherency mechanism or exporting the FETCHADD instruction, the present invention also provides support for IA-32 instructions that provide atomicity via a bus lock prefix. Details of IA-32 instruction set can be found in the Intel® Instruction Set Reference, which is hereby incorporated by reference.

In the IA-32 instruction set, the LOCK prefix can be prepended to the following instructions, and only to those forms of the instructions that access a memory operand:

ADD, ADC, AND, BTC, BTR, BTS, CMPXCHG, DEC, INC, NEG, NOT, OR, SBB, SUB, XOR, XADD, and XCHG.

Referring to FIG. 2, default control register (DCR) 30 includes IA-32 lock check enable bit (LC) 32. When LC bit 32 is set to "1", and an IA-32 atomic memory reference requires a read-modify-write operation external to the processor under an external bus lock (i. e., the instruction includes the LOCK prefix), an IA-32 intercept lock fault is raised. When LC bit 32 is cleared to "0", and an IA-32 atomic memory reference requires a read-modify-write operation external to the processor under external bus lock, the processor may either generate an IA-32 intercept lock fault (if bus locks are not supported by the computer system hardware) or perform the transaction with an external bus lock. Note that in the IA-32 architecture, an external bus lock is required for atomic memory accesses that are made to memory not cached using a write-back cache policy. In other words, external bus locks are required by the IA-32 architecture if the memory is uncacheable or cached using a write-trough policy.

Of course, in a computer system that is not capable of locking the bus, such as a computer system having multiple processors connected by multiple interconnection topologies, IA-32 instructions that are prepended with a LOCK prefix must be handled by an IA-32 intercept lock fault. In such systems, the value of LC bit 32 is irrelevant.

However, consider a computer system capable of locking the bus. While locking the bus is possible, doing so continuously may seriously degrade performance. Accordingly, it may be desirable to emulate the IA-32 instruction prepended with the LOCK prefix by using instructions that do not lock the bus. While emulation is not as fast as direct execution by hardware, overall system performance may be greater because other CPUs and devices can continue to access the bus while the IA-32 instruction prepended with the LOCK prefix is emulated. In such systems, the value of LC bit 32 determines whether IA-32 instructions prepended with the LOCK prefix will be executed by hardware using a bus lock, or will be emulated in software without using a bus lock. Of course, when emulating IA-32 instructions prepended with the LOCK prefix, the emulation code may use the cache coherency mechanism and/or the exportable FETCHADD instruction to ensure atomicity.

Returning to FIG. 2, assume that an IA-32 instruction from the set of ADD, ADC, AND, BTC, BTR, BTS, CMPXCHG, DEC, INC, NEG, NOT, OR, SBB, SUB, XOR, XADD, and XCHG instructions is prepended with the LOCK prefix and accesses a memory location, and is loaded into instruction register 20. Further assume that LC bit 32 in DCR 30 is set to "1". In response to such an instruction, instruction decode and execution logic 22 generates an IA-32 intercept lock fault. Logic 22 loads the address stored in IA-32 intercept lock fault entry 34 in fault handler pointers 24 into program counter 26, which in turn causes the first instruction of software-based IA-32 intercept lock fault handler 28 to be executed by loading the first instruction of fault handler 28 into instruction register 20. Fault handler 28 examines the IA-32 instruction that caused the interruption and branches to the appropriate code to atomically emulate the instruction. After the IA-32 instruction is emulated, and the proper values have been stored in register file 42, L1 and L2 caches 40, and main memory 18 in FIG. 1, fault handler 28 exits and execution continues with the instruction immediately after the instruction that caused the fault.

Note that. fault handler 28 may include exportable FETCHADD instructions, as described above. For example, an IA-32 XADD instruction coded to increment the destination memory location by "1" can be emulated by a FETCHADD instruction having the increment value (INC) set to "1". Other instructions that cannot be emulated by the FETCHADD instruction can be emulated by instructions that obtain exclusive use of the cache line containing the memory location to be altered.

In summary, LC bit 32 of DCR 30 and software-based IA-32 intercept lock fault handler 28 allow CPU 12 to atomically execute IA-32 instructions prepended with the LOCK prefix without locking the bus. Accordingly, the present invention allows a computer system having a 64-bit architecture to maintain binary compatibility with IA-32 instructions, while maintaining the superior performance provided by the 64-bit architecture.

Although the present invention has been described with reference to preferred embodiments, workers skilled in the art will recognize that changes may be made in form and detail without departing from the spirit and scope of the invention.

What is claimed is:

1. A cental processing unit capable of being connected to an external memory controller comprising:

an instruction register capable of receiving an exportable fetch and add instruction;

a translation lookaside buffer (TLB) having a plurality of entries that store virtual-to-physical memory translations, with each entry including memory access bits that specify whether a physical page associated with the virtual-to-physical memory translation stored in the entry supports a write-back memory policy or supports an uncacheable but exportable memory policy;

one or more cache memories connected between the TLB and the external memory controller; and instruction decode and execution logic coupled to the instruction register, the external memory controller, and the TLB, wherein the instruction decode and execution logic executes the exportable fetch and add instruction by examining memory attributes of the entry of the TLB corresponding to a target memory location specified by an exportable fetch and add instruction, and if the memory attributes specify that the target memory location supports the write-back memory policy, a cache line containing a copy of the target memory location is loaded in an "Exclusive" coherency state into the one or more cache memories, and the exportable fetch and add instruction is completed using the copy of the target memory location stored in the one or more cache memories, and if the memory attributes specify that the target memory location supports the uncacheable but exportable memory policy, the exportable fetch and add instruction is exported to the external memory controller to be executed by the external memory controller.

2. The central processing unit of claim 2 wherein the instruction register is also capable of receiving an instruction having a bus lock prefix set, and the central processing unit further comprising:

trap handler pointers that point software-based bus lock fault handler routines; and a default control register having a lock check enable bit, wherein instruction decode and execution logic executes a software-based bus lock fault handler routine that emulates the instruction having the bus lock prefix set when the lock check enable bit is set, and executes the instruction having the bus lock prefix clear by locking a bus coupling the central processing unit to the external memory controller when the lock check enable bit is clear.

3. A cental processing unit capable of being connected to an external memory controller comprising:

an instruction register capable of receiving an instruction having a bus lock prefix set;

trap handler pointers that point software-based bus lock fault handler routines;

a default control register having a lock check enable bit; and instruction decode and execution logic coupled to the instruction register, the external memory controller, the trap handler pointers, and the default control registers wherein instruction decode and execution logic executes a software-based bus lock fault handler routine that emulates the instruction having the bus lock prefix set when the lock check enable bit is set, and executes the instruction having the bus lock prefix clear by locking a bus coupling the central processing unit to the external memory controller when the lock check enable bit is clear.

4. The central processing unit of claim 3 wherein the instruction register is also capable of receiving an exportable fetch and add instruction, and the central processing unit further comprises:

a translation lookaside buffer (TLB) having a plurality of entries that store virtual-to-physical memory translations, with each entry including memory access bits that specify whether a physical page associated with the virtual-to-physical memory translation stored in the entry supports a write-back memory policy or supports an uncacheable but exportable memory policy;

one or more cache memories connected between the TLB and the external memory controller;

and wherein the instruction decode and execution logic is also coupled to the TLB, and the instruction decode and execution logic executes the exportable fetch and add instruction by examining the memory attributes of the entry of the TLB corresponding to a target memory location specified by the exportable fetch and add instruction, and if the memory attributes specify that the target memory location supports the write-back memory policy, a cache line containing a copy of the target memory location is loaded as exclusive into the one or more cache memories, and the fetch and add instruction is completed using the copy of the target memory location stored in the one or more cache memories, and if the memory attributes specify that the target memory location supports the uncacheable but exportable memory policy, the exportable fetch and add instruction is exported to the external memory controller to be executed by the external memory controller.

5. A multi-processor computer system comprising:

a main memory unit;

a memory controller coupled to the main memory unit, the memory controller capable of receiving and executing an exportable fetch and add instruction; and a plurality of central processing units coupled to the memory controller, with each central processing unit comprising:

an instruction register capable of receiving an exportable fetch and add instruction;

a translation lookaside buffer (TLB) having a plurality of entries that store virtual-to-physical memory translations, with each entry including memory access bits that specify whether a physical page associated with the virtual-to-physical memory translation stored in the entry supports a write-back memory policy or supports an uncacheable but exportable memory policy;

one or more cache memories connected between the TLB and the memory controller; and instruction decode and execution logic coupled to the instruction register, the memory controller, and the TLB, wherein the instruction decode and execution logic executes the exportable fetch and add instruction by examining the memory attributes of the entry of the TLB corresponding to a target memory location specified by the exportable fetch and add instruction, and if the memory attributes specify that the target memory location supports the write-back memory policy, a cache line containing a copy of the target memory location is loaded as exclusive into the one or more cache memories, and the fetch and add instruction is completed using the copy of the target memory location stored in the one or more cache memories, and if the memory attributes specify that the target memory location supports the uncacheable but exportable memory policy, the exportable fetch and add instruction is exported to the memory controller to be executed by the memory controller.

6. The multi-processor computer system of claim 5 wherein the instruction register of each central processing unit is also capable of receiving an instruction having a bus lock prefix set, and each central processing unit further comprises:

trap handler pointers that point software-based bus lock fault handler routines; and a default control register having a lock check enable bit, wherein instruction decode and execution logic executes a software-based bus lock fault handler routine that emulates the instruction having the bus lock prefix set when the lock check enable bit is set, and executes the instruction having the bus lock prefix clear by locking a bus coupling the central processing unit to the memory controller when the lock check enable bit is clear.

* * * * *

UNITED STATES PATENT AND TRADEMARK OFFICE
CERTIFICATE OF CORRECTION

PATENT NO.      : 6,430,657 B1
DATED           : August 6, 2002
INVENTOR(S)     : Mittal et al.

It is certified that error appears in the above-identified patent and that said Letters Patent is hereby corrected as shown below:

<u>Column 10,</u>
Line 25, delete "cental" and insert therefor -- central --
Line 62, delete "claim 2" and insert therefor -- claim 1--

<u>Column 11,</u>
Line 10, delete "cental" and insert therefor -- central --

Signed and Sealed this

Fifteenth Day of July, 2003

JAMES E. ROGAN
*Director of the United States Patent and Trademark Office*